United States Patent
Kifuku et al.

(10) Patent No.: US 6,903,524 B2
(45) Date of Patent: Jun. 7, 2005

(54) ELECTRIC MOTOR-DRIVEN POWER STEERING APPARATUS

(75) Inventors: Takayuki Kifuku, Tokyo (JP); Yasuhiro Hosaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/680,203

(22) Filed: Oct. 8, 2003

(65) Prior Publication Data

US 2004/0200663 A1 Oct. 14, 2004

(30) Foreign Application Priority Data

Apr. 10, 2003 (JP) .................................... P2003-106335

(51) Int. Cl.⁷ .............................................. H02P 1/22
(52) U.S. Cl. ...................... 318/293; 318/563; 318/280; 318/281; 318/282; 318/286; 318/289
(58) Field of Search .............................. 318/293, 563, 318/280, 281, 282, 286, 289, 300

(56) References Cited

U.S. PATENT DOCUMENTS

| | | | | |
|---|---|---|---|---|
| 4,319,170 A | * | 3/1982 | Brent | 318/376 |
| 4,649,326 A | * | 3/1987 | Mansmann et al. | 318/293 |
| 4,710,686 A | * | 12/1987 | Guzik | 318/293 |
| 5,174,854 A | * | 12/1992 | Sano et al. | 117/67 |
| 5,455,496 A | * | 10/1995 | Williams et al. | 318/563 |
| 5,574,344 A | * | 11/1996 | Matsuoka et al. | 318/293 |

FOREIGN PATENT DOCUMENTS

| | | |
|---|---|---|
| JP | 7-96387 B2 | 10/1995 |
| JP | 2506269 B2 | 4/1996 |
| JP | 2001-106098 A | 4/2001 |

* cited by examiner

Primary Examiner—Rita Leykin
(74) Attorney, Agent, or Firm—Sughrue Mion, PLLC

(57) ABSTRACT

In an electric motor-driven power steering apparatus which comprises a bridge circuit for connecting a power source between input terminals and also connecting an electric motor between output terminals and energizes the electric motor by this bridge circuit and operates electric motor power to a steering system, the bridge circuit includes a predetermined number of arms constructed by connecting circuits for connecting switching elements in parallel with diodes in series so that the diodes mutually become reverse polarity.

6 Claims, 4 Drawing Sheets

ELECTRIC MOTOR-DRIVEN POWER STEERING APPARATUS

BACKGROUND OF THE INVENTION

1. Field of the Invention

The present invention relates to an electric motor-driven power steering apparatus.

2. Description of the Related Art

Conventionally, an electric motor-driven power steering apparatus in which improvements in fuel consumption can be achieved using an electric motor as power has been commercialized with respect to an oil hydraulic power steering apparatus using oil pressure as power.

For example, as shown in FIG. 3, a controller of such an electric motor-driven power steering apparatus comprises a bridge circuit constructed of four MOS field-effect transistors (hereinafter called an FET) Q1 to Q4, and a battery B is connected between the input terminals and a DC motor M is connected between the output terminals and by performing ON driving or PWM driving of the FETs forming opposite sides, driving is performed in the right direction or the left direction.

Also, in case that a fault (hereinafter called an ON fault) resulting in an ON state even in a non-driving state occurs in one of the FETs Q1 to Q4 constructing the bridge circuit (in FIG. 3, case that an ON fault occurs in Q3), even when the controller detects this ON fault and stops control, a closed circuit made of the DC motor M and parasitic diodes of the FETs Q3 and Q4 is constructed and when a driver steers, the DC motor M acts as a power generator and a power generation current (braking current) flows (shown by an arrow of a solid line in FIG. 3), so that there was a problem that steering force necessary for the driver to steer becomes larger than the case of merely stopping control (that is, manual steering force) and steering feeling is remarkably made worse.

In order to solve this problem, as shown in FIG. 4, a motor relay R1 is inserted between the output terminal of the bridge circuit and the DC motor M and in case that some abnormality including an ON fault occurs in the controller, by opening this motor relay R1, the construction of the closed circuit described above was prevented and the necessary steering force was prevented from becoming large.

Since parasitic diodes are present in the FETs Q1 to Q4 constructing this bridge circuit in its structure, in case of making connection by wrong polarity when the battery is connected between the input terminals of the bridge circuit (shown by a broken line of FIG. 3), there is a problem that a short-circuit current flows through the parasitic diodes (shown by an arrow of the broken line in FIG. 3) and the FETs Q1 to Q4 are destroyed, and in order to prevent this, a power source relay R2 of normal open was inserted between the input terminal and the battery as shown in FIG. 4.

Also, in order to solve this problem similarly, it is proposed that a two-contact relay should be inserted into each the input terminal of the bridge circuit.

In the controller as described above, it is necessary to insert the relay in any case. Additionally, in order to solve both of the problems described above, it is necessary to insert two relays. It is necessary to pass an electric motor current through this relay at the normal time and a current of several tens of amperes flows in the electric motor-driven power steering apparatus, so that it was necessary to use a large-size relay with a large current capacity and it resulted in an obstacle to miniaturization of the controller.

Also, when a relatively large-size relay is installed on a substrate etc., its center of gravity is separate from the installation surface (becomes high) and the relay is susceptible to various vibrations (engine vibration or travel vibration) of a vehicle in which the electric motor-driven power steering apparatus is mounted, and a connection place of the relay may break and also a contact of the relay may weld and in case that the contact welds, prevention of an increase in the necessary steering force due to an ON fault of the FET or protection against connection by wrong polarity of the battery became impossible and it resulted in an obstacle to an aspect of an improvement in reliability of the controller.

SUMMARY OF THE INVENTION

The invention solves problems as described above, and an object of the invention is to provide an electric motor-driven power steering apparatus for implementing prevention of an increase in the necessary steering force due to an ON fault of an FET or protection against connection by wrong polarity of a battery without causing upsizing of a controller or a reduction in reliability.

An electric motor-driven power steering apparatus according to the invention includes a steering system, a bridge circuit, a power source and an electric motor.

The bridge circuit is connected a power source between input terminals and also connected an electric motor between output terminals. And the bridge circuit energizes the electric motor and operates electric motor power to a steering system. The bridge circuit includes predetermined number of arms including connecting circuits for connecting switching elements in parallel with diodes in series so that the diodes mutually become reverse polarity.

Also, the electric motor is a DC motor and the bridge circuit includes four arms and ON driving of one of the opposite arms is performed and PWM driving of the other of the opposite arms is performed and the arms in which the ON driving is performed include connecting circuits for connecting switching elements in parallel with diodes in series so that the diodes mutually become reverse polarity.

Also, the electric motor is a DC motor and the bridge circuit includes four arms and all the arms include connecting circuits for connecting switching elements in parallel with diodes in series so that the diodes mutually become reverse polarity.

Also, the electric motor is a three-phase motor and the bridge circuit includes six arms and all the arms include connecting circuits for connecting switching elements in parallel with diodes in series so that the diodes mutually become reverse polarity.

Further, the electric motor-driven power steering apparatus includes an capacitor for noise elimination, and at least one end of the capacitor is connected to a connection point for connecting circuits for connecting switching elements in parallel with diodes in series so that the diodes mutually become reverse polarity.

Furthermore, the switching element is a field-effect transistor and the diode connected in parallel is a parasitic diode of the field-effect transistor.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

Figure 1:
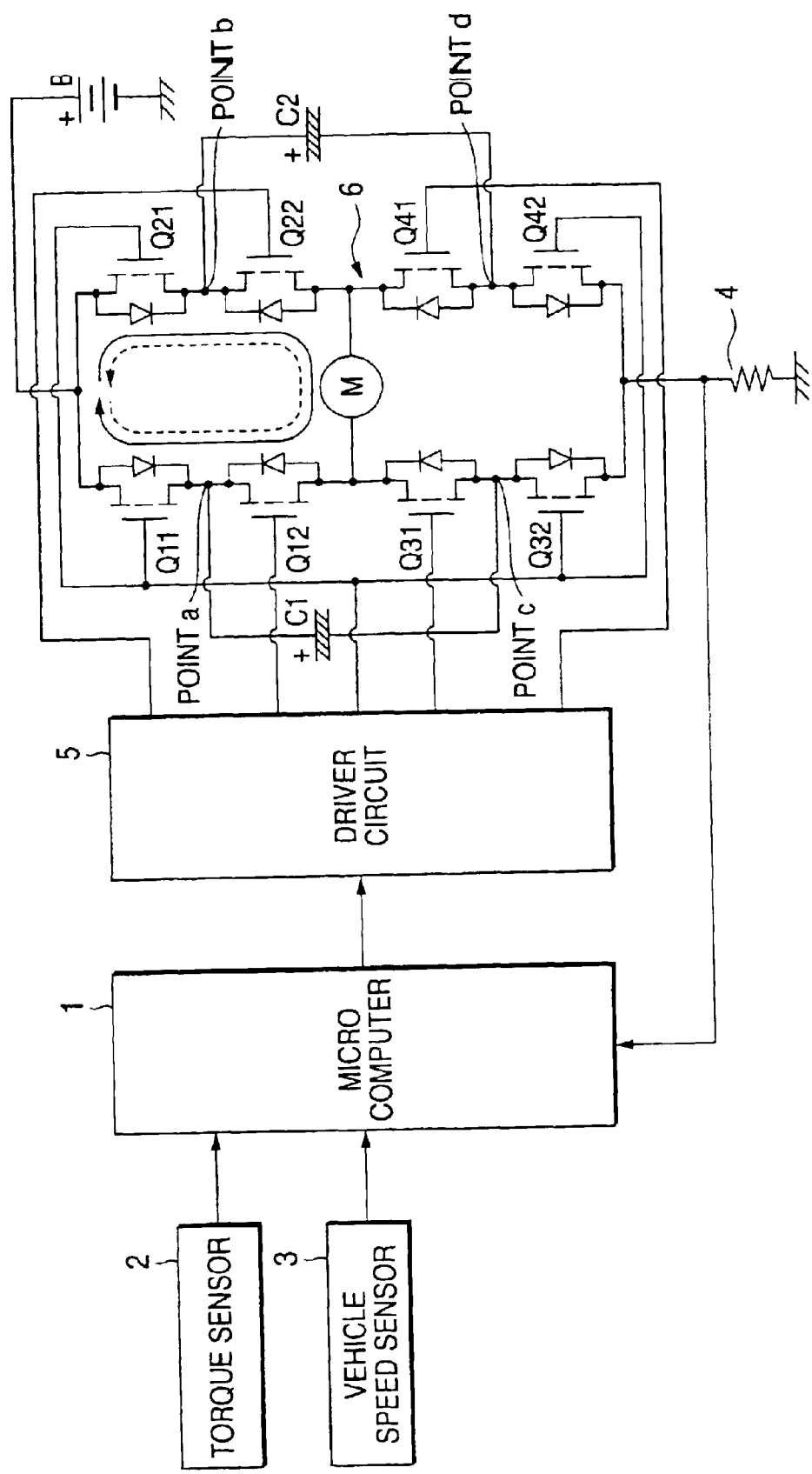
FIG. 1 is a diagram showing a configuration and an action of one embodiment of an electric motor-driven power steering apparatus according to the invention.

One embodiment of the invention will be described below. FIG. 1 is a diagram showing the entire configuration of one embodiment of the invention. In an electric motor-driven power steering apparatus, a microcomputer 1 calculates the necessary assist torque and assist direction based on input of steering torque detected by a torque sensor 2 acting on a steering system (not shown), a vehicle speed detected by a vehicle speed sensor 3, a current flowing through a DC motor M detected by a current sensor 4, etc. and transmits a target electric motor current in response to this assist torque and an electric motor driving direction in response to the assist direction to a driver circuit 5 and the driver circuit 5 performs ON driving or PWM driving of FETs Q11 to Q42 constructing a bridge circuit and thereby the DC motor M is driven and steering force is assisted by applying generation torque of this DC motor M to the steering system through a reduction gear (not shown).

The bridge circuit in the electric motor-driven power steering apparatus according to the invention is constructed of parallel circuits (Q11 to Q42) of eight switching elements and diodes as shown in FIG. 1 and the switching elements use FETs and the diodes are constructed of parasitic diodes of the FETs. Further, one arm of the bridge circuit is constructed using two FETs as one pair (Q11 and Q12, Q21 and Q22, Q31 and Q32, Q41 and Q42), and this one pair of FETs is connected in series so that the mutual parasitic diodes become reverse polarity (hereinafter Q11, Q21, Q32, Q42 among these FETs are called backward FETs and Q12, Q22, Q31, Q41 are called forward FETs).

The electric motor-driven power steering apparatus according to the invention is an apparatus for generating torque (assist torque) of the right direction and the left direction to the DC motor M by performing ON driving or PWM driving of the eight FETs through a driving signal from the driver circuit 5 as described above, and the driving signal of this driver circuit 5 will be described.

When an IG switch (not shown) of a vehicle is first turned on, a power source is supplied from a battery B and the microcomputer 1 starts. The microcomputer 1 makes an abnormal determination etc. generally known at the time of the starting, and further outputs an action command to the driver circuit 5. The driver circuit 5 receiving this action command outputs a signal for performing ON driving of all the backward FETs Q11, Q21, Q32, Q42. This signal for performing ON driving of the backward FETs Q11, Q21, Q32, Q42 is always outputted until the IG switch is turned off or the microcomputer 1 detects that some abnormality occurs in a system and stops control. The microcomputer 1 further receives output of the torque sensor 2, the vehicle speed sensor 3, the current sensor 4, etc. and determines assist torque and an assist direction and transmits a target electric motor current and an electric motor driving direction in response to these to the driver circuit 5 and based on this, the driver circuit 5 performs ON driving or PWM driving of the forward FETs (Q12 and Q41 or Q22 and Q31) constructing the opposite arms of the bridge circuit.

The electric motor-driven power steering apparatus according to the invention is constructed as described above, and even in case of making connection by wrong polarity of the battery B, a short-circuit current can be prevented from flowing by the parasitic diodes of the backward FETs Q11, Q21, Q32, Q42. Also, in case that an ON fault occurs in any one of the FETs, for example, in case that an ON fault occurs in the forward FET Q12, the microcomputer 1 detects the ON fault of this forward FET Q12 and the driver circuit 5 stops output of a driving signal to all of the eight FETs. As a result of this, all of the seven FETs other than the forward FET Q12 in which the ON fault occurs are turned off. In the case of being in this state, even when a driver steers and the DC motor M acts as a power generator, a braking current is prevented from flowing by the parasitic diode of the forward FET Q22 for an arrow direction of a solid line in FIG. 1 and the parasitic diodes of the backward FET Q21 and the forward FET Q12 for an arrow direction of a broken line in FIG. 1 in reverse, and steering force necessary for the driver to steer does not become larger than manual steering force.

Also, the electric motor-driven power steering apparatus according to the invention is constructed as described above and a relay which is a large-size part among parts constructing a controller is not used, so that upsizing of the controller is not caused and further in the case of being installed on a substrate, the center of gravity is low with respect to the substrate surface and resistance to vibrations of a vehicle is high and there is an extremely low possibility of a broken wire of a connection place and also there is no possibility of welding of a contact as caused in the relay and reliability of the controller improves dramatically.

Also, in FIG. 1, capacitors C1, C2 for noise elimination are connected between connection points a and c and between connection points b and d of one pair of FETs. By connecting the capacitors in this manner, even in case of making connection by wrong polarity of the battery B, a backward voltage is not applied to the capacitors C1, C2 by the parasitic diodes of the backward FETs and the capacitors can be protected. Incidentally, connection of the capacitors is not limited to the connection of FIG. 1 and, for example, the capacitors may be connected between the point a and a ground and between the point b and the ground, or between the point c and a battery and between the point d and the battery, and in a word, similar effect can be taken as long as there are connections capable of preventing the backward voltage from being applied to the capacitors by the parasitic diodes of the backward FETs.

Also, in the embodiment described above, it has been configured so that the backward FETs Q11, Q21, Q32, Q42 are always turned on while control is performed but, for example, it may be configured so as to perform ON driving of the backward FETs Q21 and Q32 in the case of driving the forward FETs Q22 and Q31 and perform ON driving of the backward FETs Q11 and Q42 in the case of driving the forward FETs Q12 and Q41 in response to a driving direction of the DC motor M, and also the forward FET and the backward FET constructing the arm of the bridge circuit may be driven simultaneously as one pair (Q11 and Q12, Q21 and Q22, Q31 and Q32, Q41 and Q42). In this case, driving is complementarily performed so as to turn off the FETs Q21 and Q22, the FETs Q31 and Q32 when the FETs Q11 and Q12, the FETs Q41 and Q42 are in ON states.

Second Embodiment

Next, another embodiment of an electric motor-driven power steering apparatus according to the invention will be described. When a DC motor is reversibly rotated and driven using a bridge circuit, a driving method in which PWM driving of both the opposite arms is performed and a driving method in which ON driving of one of the opposite arms is performed and PWM driving of the other of the opposite arms is performed are generally known. An occurrence state of an ON fault of an FET in the case of adopting the latter driving method will be described.

Figure 3:
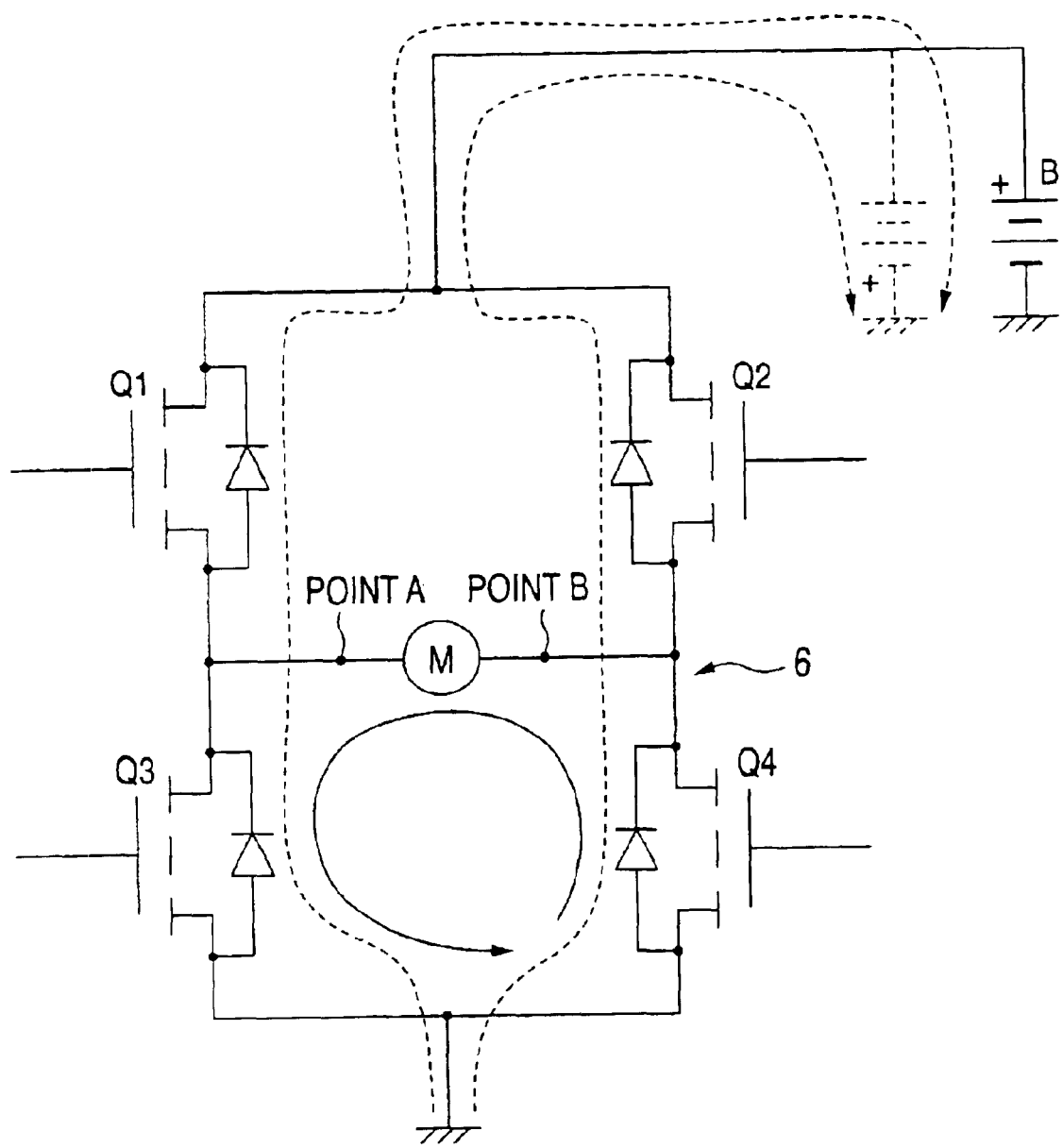
FIG. 3 is a diagram showing a configuration and an action of a bridge circuit in a conventional electric motor-driven power steering apparatus.
Figure 4:
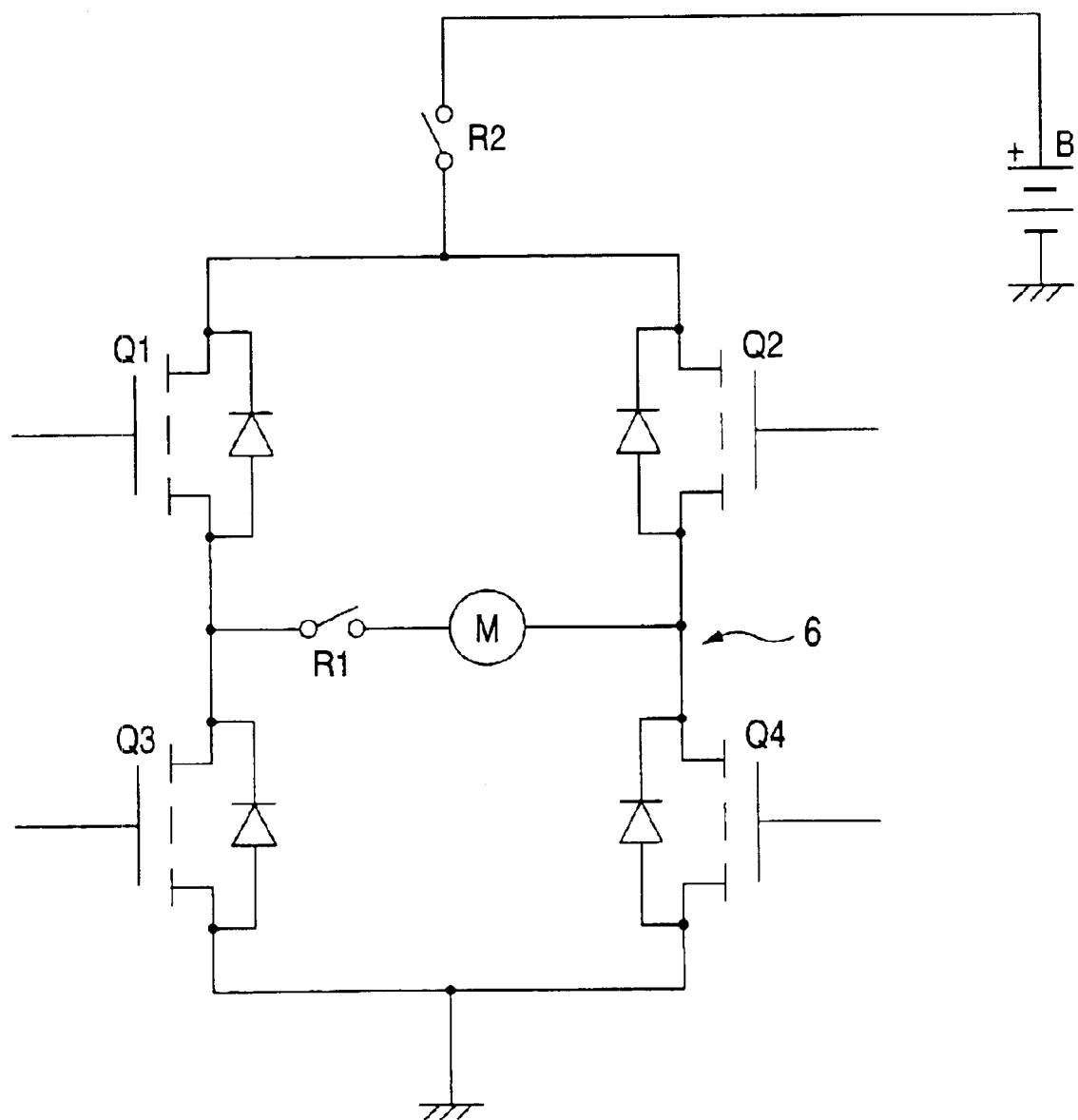
FIG. 4 is a diagram showing a configuration and an action of a bridge circuit in a conventional electric motor-driven power steering apparatus.

For example, in FIG. 3, referring to the case that ON driving of the high potential side FET (Q1 or Q2) is performed and PWM driving of the low potential side FET (Q3 or Q4) is performed, when ON driving of the high potential side FET Q1 is performed and PWM driving of the low potential side FET Q4 is performed in order to rotate and drive the DC motor M in a state in which a line-to-ground fault occurs at a point A (one of terminals of the DC motor M), there are cases that a short-circuit current flows through the FET Q1 and the FET Q1 is destroyed and an ON fault occurs. On the other hand, when ON driving of the high potential side FET Q1 is performed and PWM driving of the low potential side FET Q4 is performed in order to rotate and drive the DC motor M in a state in which a ground-to-line fault occurs at a point B (the other of terminals of the DC motor M), a short-circuit current flows through the FET Q4 but in this case, the PWM driving of the FET Q4 is performed and the current flowing through the FET Q4 is controlled by duty of the PWM signal, so that the FET Q4 does not result in destruction.

In reverse, in FIG. 3, referring to the case that PWM driving of the high potential side FET (Q1 or Q2) is performed and ON driving of the low potential side FET (Q3 or Q4) is performed, when PWM driving of the high potential side FET Q1 is performed and ON driving of the low potential side FET Q4 is performed in order to rotate and drive the DC motor M in a state in which a line-to-ground fault occurs at the point A, a short-circuit current flows through the FET Q1 but in this case, the PWM driving of the FET Q1 is performed and the current flowing through the FET Q1 is controlled by duty of the PWM signal, so that the FET Q1 does not result in destruction. On the other hand, when PWM driving of the high potential side FET Q1 is performed and ON driving of the low potential side FET Q4 is performed in order to rotate and drive the DC motor M in a state in which a ground-to-line fault occurs at the point B, there are cases that a short-circuit current flows through the FET Q4 and the FET Q4 is destroyed and an ON fault occurs.

As described above, in the case of adopting the driving method in which ON driving of one of the opposite arms of the bridge circuit is performed and PWM driving of the other of the opposite arms is performed, the ON fault occurs in the arm side in which the ON driving is performed and there is an extremely low possibility that the ON fault occurs in the side in which the PWM driving is performed.

Figure 2:
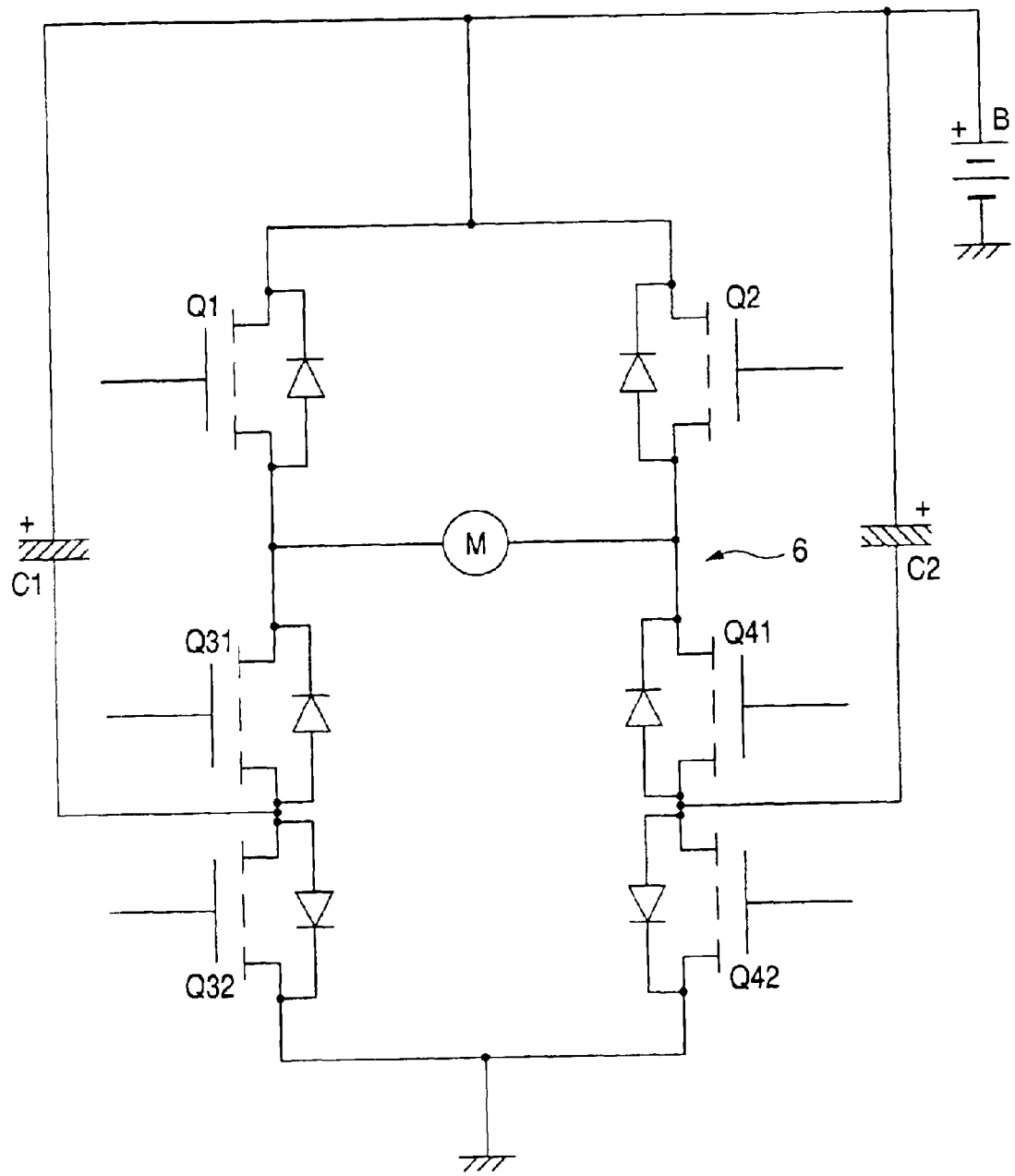
FIG. 2 is a diagram showing a main configuration of another embodiment of an electric motor-driven power steering apparatus according to the invention.

In a bridge circuit according to another embodiment of an electric motor-driven power steering apparatus according to the invention, a high potential side arm is constructed of individual FETs (Q1 and Q2) in a manner similar to the conventional bridge circuit as shown in FIG. 2. On the other hand, a low potential side arm is constructed using forward FETs (Q31 and Q41) and backward FETs (Q32 and Q42) as pairs (Q31 is paired with Q32, Q41 is paired with Q42), respectively, and this one pair of FETs is connected in series so that mutual parasitic diodes become reverse polarity. In this bridge circuit 6, PWM driving of the FET (Q1 or Q2) of the high potential side arm is performed and ON driving of the forward FET (Q31 or Q41) of the low potential side arm is performed. Also, ON driving of the backward FETs Q32 and Q42 is always performed while a controller acts.

In such a bridge circuit 6, the low potential side arm is constructed of the FETs using two FETs as one pair and even in case that an ON fault occurs in any one of the FETs (Q31, Q32, Q41, Q42) constructing the low potential side arm, construction of a closed circuit including the DC motor M is prevented by the normal FETs, so that the DC motor M is rotated by steering of a driver and acts as a power generator and an increase in steering force necessary for steering can be prevented. Also, in the high potential side arm in which the PWM driving is performed, there is an extremely low possibility that the ON fault occurs as described above, so that there is no need to provide the backward FETs in preparation for the time of occurrence of the ON fault actually.

Also, in such a bridge circuit 6, even in case of making connection by wrong polarity of the battery B, a short-circuit current can be prevented from flowing by parasitic diodes of the backward FETs Q32 and Q42. That is, the electric motor-driven power steering apparatus according to this embodiment can reduce the number of FETs used without causing a substantial reduction in reliability and can achieve more miniaturization and cost reduction with respect to the first embodiment described above.

Further, in the embodiment described above, the bridge circuit including four arms, a total of eight FETs in order to construct the bridge circuit targeted for the DC motor has been constructed, but it goes without saying that similar effect is taken even for other electric motors, and in an embodiment using a bridge circuit of three phases (six arms) like a three-phase motor such as a DC brushless motor, in the case of using motor relays, the motor relays are required every each phase, so that the number of relays installed becomes large and upsizing of a controller and a reduction in reliability are caused. However, when a bridge circuit is constructed of six arms, twelve FETs based on the invention, all the relays become unnecessary with respect to the DC motor as described above, so that more effect is taken in aspects of downsizing of the controller and an improvement in reliability without causing the upsizing of the controller or the reduction in reliability.

Incidentally, the embodiment described above has been constructed of the FETs, but it goes without saying that similar effect is taken even in the case of connecting a transistor or an IGBT in parallel with a diode. By using the FETs as the switching elements, the parasitic diodes caused in its structure are utilized and thereby there is no need to connect a diode in parallel separately and space necessary for installation in circuit mounting is small and effect capable of saving time and effort of connection is also taken.

As described above, an electric motor-driven power steering apparatus according to the invention includes a bridge circuit for connecting a power source between input terminals and also connecting an electric motor between output terminals and in the electric motor-driven power steering apparatus for energizing the electric motor by this bridge circuit and operating electric motor power to a steering system, the bridge circuit includes a predetermined number of arms constructed by connecting circuits for connecting switching elements in parallel with diodes in series so that the diodes mutually become reverse polarity, and effect of implementing prevention of an increase in the necessary steering force due to an ON fault of an FET or protection against connection by wrong polarity of a battery without causing upsizing of a controller or a reduction in reliability is taken.

Also, an electric motor is a DC motor and a bridge circuit is constructed of four arms and ON driving of one of the opposite arms is performed and PWM driving of the other of the opposite arms is performed and the arms in which the ON driving is performed are constructed by connecting circuits for connecting switching elements in parallel with diodes in series so that the diodes mutually become reverse polarity, and effect capable of reducing the number of FETs used without causing a substantial reduction in reliability and achieving more miniaturization and cost reduction is taken.

Further, at least one end of a capacitor for noise elimination is connected to a connection point for connecting circuits for connecting switching elements in parallel with diodes in series so that the diodes mutually become reverse polarity, and effect capable of protecting this capacitor without applying a backward voltage to this capacitor even in case of making connection by wrong polarity of a battery is taken.

Furthermore, a switching element is a field-effect transistor and a diode connected in parallel is a parasitic diode of the field-effect transistor, and by utilizing the parasitic diode caused in structure of the field-effect transistor, there is no need to connect a diode in parallel separately and space necessary for installation in circuit mounting is small and effect capable of also saving time and effort of connection is taken.

What is claimed is:

1. An electric motor-driven power steering apparatus comprising:

a steering system;

a bridge circuit;

a power source for connecting between input terminals of the bridge circuit; and an electric motor for connecting between output terminals of the bridge circuit, wherein:

the bridge circuit energizes the electric motor and operates electric motor power to the steering system; and the bridge circuit includes a plurality of arms, each of said plurality of arms having a connecting circuit and a pair of switching elements in parallel with diodes, said connecting circuit connecting in series the pair of switching elements in parallel with diodes, the diodes having reverse polarity with respect to one another.

2. The electric motor-driven power steering apparatus according to claim 1, wherein:

the electric motor is a DC motor;

said plurality of arms include four arms, and ON driving of one of opposite arms of said four arms is performed;

PWM driving of another of the opposite arms is performed; and each of the opposite arms includes a connecting circuit and a pair of switching elements in parallel with diodes, said connecting circuit connects in series the pair of switching elements in parallel with diodes, the diodes having reverse polarity with respect to one another.

3. The electric motor-driven power steering apparatus according to claim 1, wherein the electric motor is a DC motor and said plurality of arms include four arms, and each of the four arms includes a connecting circuit and a pair of switching elements in parallel with diodes, said connecting circuit connects in series the pair of switching elements in parallel with diodes, the diodes having reverse polarity with respect to one another.

4. The electric motor-driven power steering apparatus according to claim 1, wherein the electric motor is a three-phase motor and said plurality of arms include six arms, and each of the six arms includes a connecting circuit and a pair of switching elements in parallel with diodes, said connecting circuit connects in series the pair of switching elements in parallel with diodes, the diodes having reverse polarity with respect to one another.

5. The electric motor-driven power steering apparatus according to claim 1, further comprising a capacitor for noise elimination, wherein at least one end of the capacitor is connected to a connection point for connecting said connection circuit.

6. The electric motor-driven power steering apparatus according to claim 1, wherein the switching elements are field-effect transistors and the diodes connected in parallel are parasitic diodes of the field-effect transistors.

* * * * *